(12) United States Patent
Dougan et al.

(10) Patent No.: US 7,931,135 B2
(45) Date of Patent: Apr. 26, 2011

(54) MULTI-AREA CLUTCH ASSEMBLY

(75) Inventors: Kevin Michael Dougan, Plymouth, MI (US); Steven P. Moorman, Dexter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 401 days.

(21) Appl. No.: 12/124,602

(22) Filed: May 21, 2008

(65) Prior Publication Data

US 2009/0288927 A1  Nov. 26, 2009

(51) Int. Cl.
*F16D 25/0638* (2006.01)

(52) U.S. Cl. ............... 192/85.25; 192/85.3; 192/85.32; 192/106 F

(58) Field of Classification Search ........... 192/85.27, 192/85.29, 85.3, 85.32, 52.1, 85.25
See application file for complete search history.

(56) References Cited

U.S. PATENT DOCUMENTS

| | | | | |
|---|---|---|---|---|
| 3,365,985 A * | 1/1968 | Johnson | ............ | 475/146 |
| 5,865,289 A * | 2/1999 | Ishimaru | ............ | 192/48.611 |
| 6,035,989 A * | 3/2000 | Matsuoka | ............ | 192/85.32 |
| 6,705,447 B2 * | 3/2004 | Gorman et al. | ............ | 192/85.25 |
| 7,104,380 B2 * | 9/2006 | Bishop et al. | ............ | 192/85.32 |

* cited by examiner

*Primary Examiner* — David D Le
*Assistant Examiner* — Jacob S Scott

(57) ABSTRACT

A torque transmitting assembly includes an actuator for engaging a torque transmitting element. A mechanism is connected to the actuator. The mechanism is operable to selectively allow fluid communication therethrough. The mechanism communicates between two separate fluid spaces located on opposite sides of the actuator. During movement of the actuator, a fluid is allowed to transfer through the mechanism between the two separate fluid spaces.

15 Claims, 1 Drawing Sheet

MULTI-AREA CLUTCH ASSEMBLY

FIELD

Figure 1:
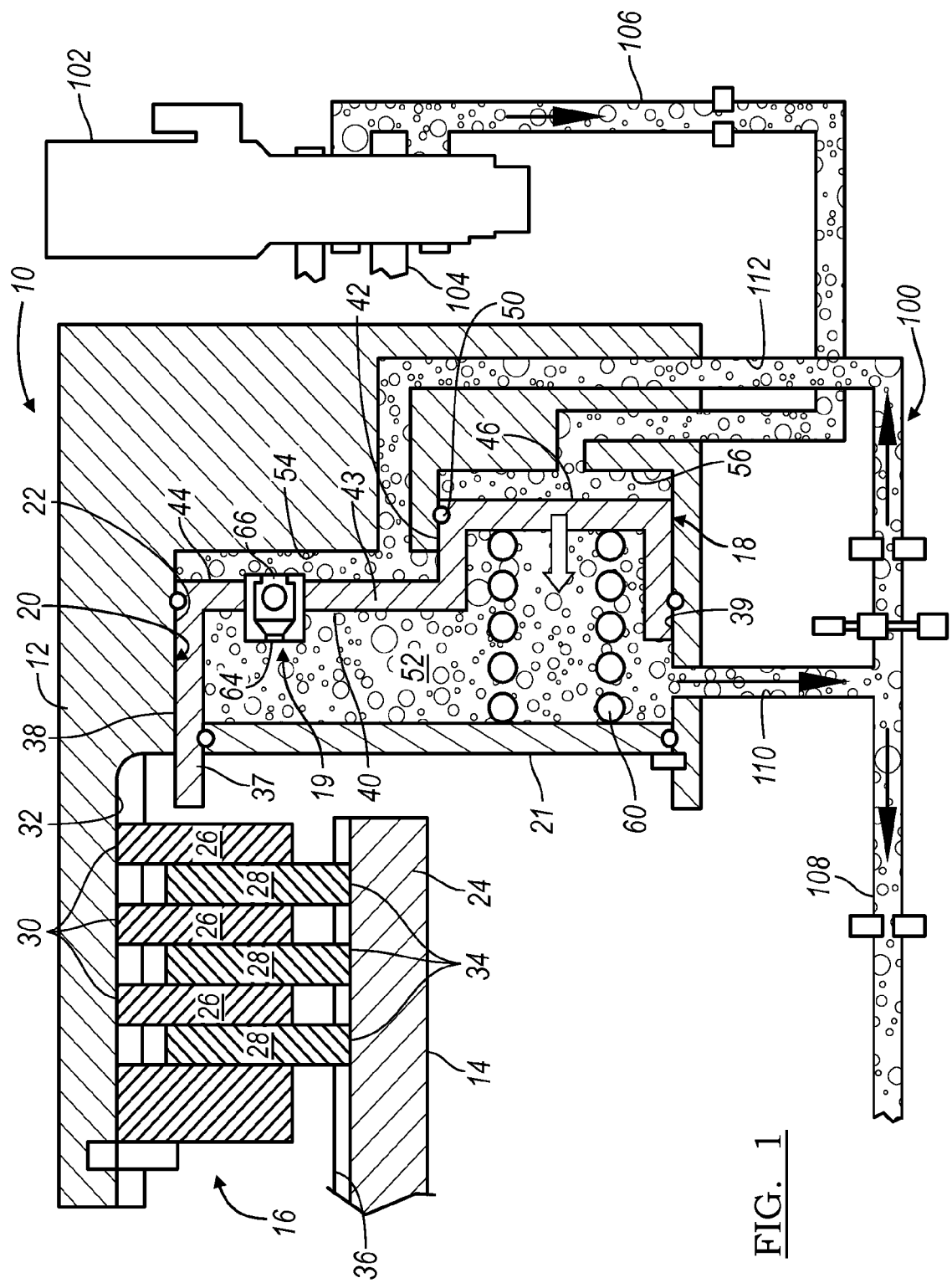

The invention relates generally to a clutch assembly, and more particularly to a multi-area clutch assembly having a quick fill mechanism.

BACKGROUND

The statements in this section merely provide background information related to the present disclosure and may or may not constitute prior art.

A typical multi-speed automatic transmission uses a combination of torque transmitting devices, such as clutches, dog clutches/synchronizers, or brakes, to achieve a plurality of forward and reverse gear or speed ratios as well as a Neutral and a Park. Selection of speed ratios is typically accomplished by a microprocessor transmission control module that employs various vehicle parameters, for example vehicle speed, and various driver input signals, for example accelerator pedal position, to select the appropriate speed ratios. The transmission then engages a combination of the toque transmitting devices to provide the desired speed ratios.

In order to engage the torque transmitting devices, a typical automatic transmission includes a hydraulic clutch control system that employs a hydraulic fluid to selectively actuate pistons within the torque transmitting devices. Actuation of a piston in turn engages the torque transmitting elements within the torque transmitting device. One piston design, known as a dual-area piston, includes two areas located on the piston that are hydraulically isolated from one another. One area is pressurized by the hydraulic fluid from the hydraulic clutch control system in order to stroke the piston. The non-pressurized area is typically connected to an exhaust backfill circuit to help prevent the creation of a vacuum within the non-pressurized area as the piston strokes. However, if the exhaust backfill circuit is unable to adequately provide a fluid to fill the non-pressurized area, issues with fluid pressure control and air entrainment may arise. Accordingly, there is a need in the art for a multi-area clutch assembly that is designed to minimize the creation of a vacuum in the non-pressurized area to thereby improve pressure control and prevent air entrainment, and that is also inexpensive and automatic.

SUMMARY

The present invention provides a torque transmitting assembly that includes an actuator for engaging a torque transmitting element. A mechanism is connected to the actuator. The mechanism is operable to selectively allow fluid communication therethrough. The mechanism communicates between two separate fluid spaces located on opposite sides of the actuator. During movement of the actuator, a fluid is allowed to transfer through the mechanism between the two separate fluid spaces.

An embodiment of the torque transmitting assembly of the present invention includes a housing that defines a cavity, an actuator slidably disposed within the cavity of the housing, wherein the actuator includes a first surface that cooperates with the housing to define a first space, a second surface that cooperates with the housing to define a second space, and a third surface that cooperates with the housing to define a third space, wherein the third space is located on a side of the actuator opposite the first and second spaces, and wherein a fluid is located within the third space, a torque transmitting element interconnected to the housing that is selectively engageable by the actuator, and a mechanism connected to the actuator for selectively communicating the fluid located in the third space between the third space and the first space. The torque transmitting element is engaged by the actuator when a pressurized fluid enters the second space and contacts the second surface of the actuator to move the actuator towards the torque transmitting element, and wherein the fluid within the third space communicates through the mechanism into the first space as the actuator moves.

In one aspect of the present invention, the mechanism is a valve.

In another aspect of the present invention, the mechanism is at least one of a ball valve and a check valve.

In yet another aspect of the present invention, the mechanism permits the fluid to flow in only one direction through the mechanism.

In yet another aspect of the present invention, the mechanism permits the fluid to pass through the mechanism when a pressure of the fluid in the third space exceeds a threshold value.

In yet another aspect of the present invention, a plurality of mechanisms are located in the actuator and are located equidistant apart from one another.

In yet another aspect of the present invention, the first space is hydraulically isolated from the second space.

In yet another aspect of the present invention, the third space is hydraulically isolated from the first space and the second space.

In yet another aspect of the present invention, a biasing member is located within the third space and is in contact with the actuator to bias the actuator away from the torque transmitting element.

Another embodiment of the torque transmitting assembly of the present invention includes a housing that defines a cavity, an actuator slidably disposed within the cavity of the housing, wherein the actuator includes a first surface that cooperates with the housing to define a first space, a second surface that cooperates with the housing to define a second space, and a third surface that cooperates with the housing to define a third space, wherein the third space is located on a side of the actuator opposite the first and second spaces, and wherein a fluid is located within the third space, a torque transmitting element interconnected to the housing that is selectively engageable by the actuator, a mechanism connected to the actuator for selectively communicating the fluid located in the third space between the third space and the first space, a first fluid passage in communication with the first space and the third space, and a second fluid passage in communication with the second space. The torque transmitting element is engaged by the actuator when a pressurized fluid is communicated by the second fluid passage to the second space and the pressurized fluid contacts the second surface of the actuator to move the actuator towards the torque transmitting element, and wherein the fluid within the third space communicates through the mechanism into the first space and the fluid within the third space communicates through the first fluid passage to the first space as the actuator moves.

In one aspect of the present invention, a valve assembly is in communication with the second fluid passage for selectively communicating the pressurized fluid into the second fluid passage.

In another aspect of the present invention, the mechanism is a valve.

In yet another aspect of the present invention, the mechanism is at least one of a ball valve and a check valve.

In yet another aspect of the present invention, the mechanism permits the fluid to flow in only one direction through the mechanism.

In yet another aspect of the present invention, the mechanism permits the fluid to pass through the mechanism when a pressure of the fluid in the third space exceeds a threshold value.

In yet another aspect of the present invention, a plurality of mechanisms are located in the actuator, wherein the mechanisms are located equidistant apart from one another.

In yet another aspect of the present invention, the first space is hydraulically isolated from the second space.

In yet another aspect of the present invention, the third space is hydraulically isolated from the first space and the second space.

In yet another aspect of the present invention, a biasing member is located within the third space and is in contact with the actuator to bias the actuator away from the torque transmitting element.

Still another embodiment of the torque transmitting assembly of the present invention includes a housing that defines a cavity, an actuator slidably disposed within the cavity of the housing, wherein the actuator includes a first surface and a second surface, wherein the first surface cooperates with the housing to define a first space and a second space, and the second surface cooperates with the housing to define a third space, wherein the third space is located on a side of the actuator opposite the first and second spaces, and wherein the first space is hydraulically isolated from the second space, a fluid located within the third space, a torque transmitting element interconnected to the housing that is selectively engageable by the actuator, and a mechanism having a first port in fluid communication with the first space and a second port in fluid communication with the third space, wherein the mechanism is operable to selectively allow fluid communication between the first port and the second port. The torque transmitting element is engaged by the actuator when a pressurized fluid enters the second space and contacts the second surface of the actuator to move the actuator towards the torque transmitting element, and wherein movement of the actuator towards the torque transmitting element allows fluid communication between the first port and the second port and the fluid within the third space communicates through the first port and the second port to the first space.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 1 is a diagrammatic cross-sectional view of a portion of an embodiment of a multi-area clutch assembly and hydraulic control system according to the principles of the present invention.

DETAILED DESCRIPTION

The following description is merely exemplary in nature and is not intended to limit the present disclosure, application, or uses.

With reference to FIG. 1, a top-half of a multi-area clutch assembly or torque transmitting assembly is generally indicated by reference number 10. The multi-area clutch assembly 10 is employed in the present embodiment within a transmission (not shown) of a motor vehicle. The multi-area clutch assembly 10 may be either a stationary clutch assembly or a rotating clutch assembly without departing from the scope of the present invention. The multi-area clutch assembly 10 generally includes a housing 12, a hub 14, a clutch pack 16, an actuator 18, and a quick fill mechanism 19. The housing 12 is preferably annular and includes an inner surface 20 and a backing plate 21. The inner surface 20 and the backing plate cooperate to define a central space or cavity 22 within the housing 12. The housing 12 may be coupled to various components within the transmission, such as, for example, gear sets, a torque converter, shafts or coupling members, or a ground such as a transmission housing or other fixed component.

The hub 14 is preferably annular and includes an end portion 24 located radially inward of the housing 12. The hub 14 may be coupled to various components within the transmission, such as, for example, gear sets, a torque converter, shafts or coupling members, or a ground such as a transmission housing or other fixed component. The hub 14 and housing 12 are rotatable with respect to one another.

The clutch pack 16 is located radially inward of the housing 12 and includes a first set of reaction discs 26 interleaved with a second set of reaction discs 28. The reaction discs 26, 28 may take various forms, such as, for example, opposing steel discs and fiber faced discs. The first set of reaction discs 26 include an outer radial surface 30 coupled to a spline 32 located in the inner surface 20 of the housing 12. The second set of reaction discs 28 include an inner radial surface 34 coupled to a spline 36 located in the end portion 24 of the hub 14. The reaction discs 26, 28 are moveable in an axial direction along the splines 32, 36, as will be described in greater detail below.

The actuator 18 is slidably disposed within the central cavity 22 and includes a piston arm 37, a radial outer end 38, a radial inner end 39, and a radially extending portion 43 that has a first surface or dam side 40 and a second surface or apply side 42. The radially extending portion 43 extends between the radial outer end 38 and the radial inner end 39. The piston arm 37 extends through the backing plate 21 out of the central cavity 22. The radial ends 38, 39 are each sealed to the inner surface 20 of the housing 12 such that the actuator 18 divides the inner cavity 22. The first surface 40 is located on a side of the actuator 18 opposite that of the second surface 42. The second surface 42 includes a first area 44 and a second area 46. The first area 44 is hydraulically isolated from the second area 46 by a seal 50 between the actuator 18 and the inner surface 20 of the housing 12. The first surface 40, the backing plate 21, and the inner surface 20 of the housing 12 cooperate to define a dam space 52. The first area 44 of the second surface 42 and the inner surface 20 of the housing 12 cooperate to define a first apply space 54. The second area 46 of the second surface 42 and the inner surface 20 of the housing 12 cooperate to define a second apply space 56. The dam space 52, the first apply space 54, and the second apply space 56 are all hydraulically isolated or sealed from one another by a plurality of the seals 50.

The actuator 18 is axially moveable within the cavity 22 between an unengaged position, illustrated in FIG. 1, and an engaged position. A biasing member 60 is located within the dam space 52 between the backing plate 21 and the actuator 18. The biasing member 60 biases the actuator 18 into the unengaged position. The biasing member 60 may take various forms, such as, for example, a coil spring or leaf spring. When the actuator 18 is in the unengaged position, the reaction discs 26, 28 are not frictionally coupled and therefore torque is not transmitted between the housing 12 and the hub 14. When the actuator 18 is in the engaged position, the piston arm 37 engages the clutch pack 16 and forces the reaction discs 26, 28 to move axially and frictionally engage one another. Accordingly, torque is transmitted between the housing 12 and the hub 14 through the clutch pack 16.

The quick fill mechanism 19 is connected to the actuator 18 to allow for selective fluid communication between the dam space 52 and the first apply space 54. In the present embodiment, the quick fill mechanism 19 is connected to the radially extending portion 43 of the actuator 18. The quick fill mechanism 19 includes a first port 64 in selective fluid communication with a second port 66. The first port 64 is in fluid communication with the dam space 52 and the second port 66 is in fluid communication with the first apply space 54. The quick fill mechanism 19 is preferably a valve, such as, for example, a ball valve having a valve ball for selectively allowing communication between the first port 64 and the second port 66 or a check valve or non-return valve that permits the fluid to pass through the quick fill mechanism in one direction only, such as from the first port 64 to the second port 66. However, various other mechanisms that allow for selective fluid communication therethrough may be employed without departing from the scope of the present invention. Additionally, the size and capacity of the quick fill mechanism 19 of the present invention may vary, however, in a preferred embodiment the quick fill mechanism 19 is a 4 mm check or ball valve. The quick fill mechanism 19 is preferably in a normally closed state such that when the actuator 18 is in the unengaged position, hydraulic fluid cannot communicate through the quick fill mechanism 19. However, as will be described in greater detail below, the quick fill mechanism 19 allows fluid to communicate from the dam space 52 to the first apply space 54 when the pressure of the fluid in the dam space 52 exceeds a threshold value. Moreover, while only one quick fill mechanism 19 is depicted in FIG. 1, it should be appreciated that a plurality of quick fill mechanisms 19 may be located in the actuator 18. In a preferred embodiment, four quick fill mechanisms 19 are located in the actuator 18 and are spaced equidistant apart from one another.

The multi-area clutch assembly 10 is controlled by a hydraulic control system 100. The hydraulic control system 100 employed with the multi-area clutch assembly 10 may have various configurations and generally includes a plurality of fluid communication channels, solenoids, and valves that operate to actuate the multi-area clutch assembly 10. For example, the hydraulic control system 100 includes a valve assembly 102 in communication with a supply line or channel 104 and a first fluid communication channel 106. The supply line 104 is in fluid communication with a pump system (not shown) and delivers a pressurized fluid flow to the valve assembly 102. The pressurized fluid flow may include any hydraulic fluid, such as, for example, an oil. The valve assembly 102 preferably includes a moveable valve and a plurality of fluid ports, though various other kinds of valve assemblies may be employed without departing from the scope of the present invention. The valve assembly 102 is operable to selectively allow the pressurized fluid flow delivered from the supply channel 104 to communicate through the valve assembly 102 into the first fluid channel 106. The first fluid channel 106 is in fluid communication with the second apply space 56 of the multi-area clutch assembly 10.

The hydraulic control system 100 further includes a second fluid communication channel 108 having a first branch or portion 110 and a second branch or portion 112. The first portion 110 is in fluid communication with the dam space 52 of the multi-area clutch assembly 10 and the second portion 112 is in fluid communication with the first apply area 54 of the multi-area clutch assembly 10. In an alternate embodiment, the second portion 112 is selectively pressurized via a hydraulic actuator (not shown) in the event that more torque capacity is needed to keep the clutch pack 16 from slipping under high torque conditions. The hydraulic actuator is in a position that couples the second fluid communication channel 108 to the second portion 112 during engagement of the actuator 18. A hydraulic fluid, such as an oil, is located within the dam space 52 and the first apply space 54.

During operation, the hydraulic control system 100 actuates the multi-area clutch assembly 10 by using the pressurized fluid flow to actuate the actuator 18. For example, to engage the multi-area clutch assembly 10, the valve 102 opens and permits the pressurized fluid flow to communicate through the valve 102, through the first fluid communication channel 106, and into the second apply space 56. The pressurized fluid flow contacts the second area 46 of the actuator 18 and moves the actuator 18 against the spring 60 to the engaged position. As noted above, when the actuator 18 is in the engaged position, the piston arm 37 engages the clutch pack 16 and forces the reaction discs 26, 28 to move axially and frictionally engage one another. Accordingly, torque is transmitted between the housing 12 and the hub 14 through the clutch pack 16. As the actuator 18 is urged into the engaged position, the dam space 52 decreases in volume while the first and second apply spaces 54, 56 increase in volume. Accordingly, as the volume of the dam space 52 decreases, the hydraulic fluid located within the dam space 52 is urged out into the first portion 110 of the second fluid communication channel 108. A portion of the hydraulic fluid moves into the second portion 112 of the second fluid communication channel is delivered into the expanding first apply space 54. Additional hydraulic fluid located in the dam space 52 passes through the quick fill mechanism 19 directly into the first apply space 54 when the pressure of the hydraulic fluid exceeds a threshold value sufficient to open the quick fill mechanism 19. This prevents a vacuum from forming in the first apply space 54 as the pressurized hydraulic fluid flow urges the actuator 18 to the engaged position.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque transmitting assembly comprising:
   a housing that defines a cavity;
   an actuator slidably disposed within the cavity of the housing, wherein the actuator includes a first surface that cooperates with the housing to define a first space, a second surface that cooperates with the housing to define a second space wherein the first space is hydraulically isolated from the second space, and a third surface that cooperates with the housing to define a third space, wherein the third space is located on a side of the actuator opposite the first and second spaces, and wherein a fluid is located within the third space;
   a torque transmitting element interconnected with the housing that is selectively engageable by the actuator; and
   a ball valve connected to the actuator for selectively communicating the fluid located in the third space between the third space and the first space, and
   wherein the torque transmitting element is engaged by the actuator when a pressurized fluid enters the second space and contacts the second surface of the actuator to move the actuator towards the torque transmitting element, and wherein the fluid within the third space communicates through the ball valve into the first space as the actuator moves.

2. The torque transmitting assembly of claim 1 wherein the ball valve permits the fluid to flow in only one direction through the ball valve.

3. The torque transmitting assembly of claim 1 wherein the ball valve permits the fluid to pass through the ball valve when a pressure of the fluid in the third space exceeds a threshold value.

4. The torque transmitting assembly of claim 1 further comprising a plurality of ball valves located in the actuator, wherein the ball valves are located equidistant apart from one another.

5. The torque transmitting assembly of claim 1 wherein the third space is hydraulically isolated from the second space.

6. The torque transmitting assembly of claim 1 further comprising a biasing member located within the third space, wherein the biasing member is in contact with the actuator to bias the actuator away from the torque transmitting element.

7. An assembly comprising:
a housing that defines a cavity;
an actuator slidably disposed within the cavity of the housing, wherein the actuator includes a first surface that cooperates with the housing to define a first space, a second surface that cooperates with the housing to define a second space wherein the first space is hydraulically isolated from the second space, and a third surface that cooperates with the housing to define a third space, wherein the third space is located on a side of the actuator opposite the first and second spaces, and wherein a fluid is located within the third space;
a torque transmitting element interconnected with the housing that is selectively engageable by the actuator;
a mechanism connected to the actuator for selectively communicating in one direction only the fluid located in the third space from the third space to the first space;
a first fluid passage in communication with the first space and the third space;
a second fluid passage in communication with the second space, and
wherein the torque transmitting element is engaged by the actuator when a pressurized fluid is communicated by the second fluid passage to the second space and the pressurized fluid contacts the second surface of the actuator to move the actuator towards the torque transmitting element, and wherein the fluid within the third space communicates through the mechanism into the first space and the fluid within the third space communicates through the first fluid passage to the first space as the actuator moves.

8. The assembly of claim 7 further comprising a valve assembly in communication with the second fluid passage for selectively communicating the pressurized fluid into the second fluid passage.

9. The torque transmitting assembly of claim 8 wherein the mechanism is a valve.

10. The torque transmitting assembly of claim 9 wherein the mechanism is at least one of a ball valve and a check valve.

11. The torque transmitting assembly of claim 9 wherein the mechanism permits the fluid to pass through the mechanism when a pressure of the fluid in the third space exceeds a threshold value.

12. The torque transmitting assembly of claim 9 further comprising a plurality of mechanisms located in the actuator, wherein the mechanisms are located equidistant apart from one another.

13. The torque transmitting assembly of claim 9 wherein the third space is hydraulically isolated from the second space.

14. The torque transmitting assembly of claim 13 further comprising a biasing member located within the third space, wherein the biasing member is in contact with the actuator to bias the actuator away from the torque transmitting element.

15. A torque transmitting assembly comprising:
a housing that defines a cavity;
an actuator slidably disposed within the cavity of the housing, wherein the actuator includes a first surface and a second surface, wherein the first surface cooperates with the housing to define a first space and a second space, and the second surface cooperates with the housing to define a third space, wherein the third space is located on a side of the actuator opposite the first and second spaces, and wherein the first space is hydraulically isolated from the second space;
a fluid located within the third space;
a torque transmitting element interconnected with the housing that is selectively engageable by the actuator; and
a mechanism having a first port in fluid communication with the first space and a second port in fluid communication with the third space, wherein the mechanism is operable to selectively allow only one-way fluid communication from the first port to the second port, and
wherein the torque transmitting element is engaged by the actuator when a pressurized fluid enters the second space and contacts the second surface of the actuator to move the actuator towards the torque transmitting element, and wherein movement of the actuator towards the torque transmitting element allows fluid communication between the first port and the second port and the fluid within the third space communicates through the first port and the second port to the first space.

* * * * *